Patented Mar. 23, 1948

2,438,230

UNITED STATES PATENT OFFICE 2,438,230

PRODUCTION OF AQUEOUS SOLS OF HYDROUS OXIDES

John W. Ryznar, La Grange, Ill., assignor to National Aluminate Corporation, Chicago, Ill., a corporation of Delaware.

No Drawing. Application October 26, 1944, Serial No. 560,521

10 Claims. (Cl. 252—313)

The present invention relates to a novel method of producing aqueous colloidal solutions, that is to say sols, of hydrous oxides by a process which involves the abstraction from salts of elements capable of forming such oxides, the therewith associated anions, leaving the hydrous oxides in a state of colloidal dispersion or solution.

Generally speaking, colloidal aqueous solutions or sols of hydrous oxides have been prepared by methods other than the methods described hereinbelow. Thus various hydrous oxides, such as for instance aluminum hydroxides in various states of hydration, have been peptized and converted into the colloidal state.

Other methods have involved the use of various methods of dialysis, electro-osmosis, and the like.

The present invention, however, differentiates radically from any of these prior proposals, and constitutes an entirely new and practical method for the production of colloidal aqueous sols of hydrous oxides.

Among the materials which are suitable for conversion into sols of hydrous oxides, are for example salts of aluminum, iron, cobalt, manganese, nickel, and the like, all of which are elements capable of forming insoluble hydroxides.

Thus it is well known that if aqueous solutions of the salts of such metals as above outlined are treated with an equivalent amount of an alkali, for example, sodium hydroxide or ammonium hydroxide, they will form gelatinous precipitates of the corresponding hydroxides.

Thus aluminum sulfate when precipitated with ammonium hydroxide, will yield ammonium sulfate, and a gelatinous precipitate of aluminum hydroxide. Ferrous salts will form ferrous hydroxide, ferric salts will form ferric hydroxide, cobalt salts will form cobalt hydroxide, etc. The hydroxides thus formed, however, are invariably in the form of precipitates, and not in the form of colloidal solutions or sols.

The reason that sols do not form is that, by metathesis, certain electrolyte salts are formed which serve to coagulate the hydroxides, usually forming an irreversible precipitate of the corresponding hydroxide.

It has been already known that the ferric salts of weak acids, such as ferric acetate, when dissolved in water, tend to hydrolyze with the formation of a certain amount of colloidally dispersed ferric hydroxide. The action of water upon ferric chloride also tends to form a sol of ferric hydroxide; such a sol, however, will still contain free hydrochloric acid formed as the other product of the hydrolysis of the ferric chloride.

For many purposes, relatively pure sols of hydrous oxides are very desirable, particularly for medicinal uses, as reagents, and for the carrying out of research, and for the manufacture of various chemical products. In other words, it is very desirable to be able to produce, relatively inexpensively, reasonably concentrated sols of hydrous oxides, which sols are comparatively free from electrolytes.

Applicant has made the rather surprising discovery that by passing dilute aqueous solutions of the salt of elements capable of forming insoluble hydrous oxides through a suitable mass of anion-exchange material, it is possible to abstract the anion from the solution, leaving the cation metal in the form of a hydrous oxide sol. Examples of the present invention comprise the formation of aqueous sols of aluminum hydroxide or aluminum hydrate; ferrous and ferric hydroxides; cobalt and nickel hydroxides, chromium hydroxide and the like.

In general it is desirable that the anion-exchange material be either one that has been freshly made, or, if it has previously been used, that it has been brought to the optimum condition of exchange reactivity by suitable regeneration by means of an alkali.

Exchange materials of this kind are already well known. In general they consist of resinous condensation products of the type exemplified by the amine-aldehyde condensation products. Typical examples of these are condensation products of metaphenylenediamine and formaldehyde. A number of these are available on the market today under various trade names. Typical anion exchangers are described in U. S. Patents 2,104,501, 2,151,883 and 2,341,907.

The invention, however, is not limited to that particular type of resinous exchange material. In general the inorganic exchangers may include metallic oxides, but preferably synthetic resins of the metaphenylenediamine-formaldehyde type are used.

One of the characteristics of these exchangers is the fact that when an acid is passed through them, the anions are absorbed by the anion exchanger. In the past, these types of anion exchangers have been used primarily in connection with masses or beds of cation exchangers, which remove the cations from solutions of salts, leaving the corresponding acid in solution, which acid was then removed from the water by the anion exchanger. Commercial applications have been made of this general process for the purification of water. Thus a water containing dissolved salts has been first passed through a cation exchanger to remove the metallic components or cations, and then through an anion exchanger to remove the anion, leaving practically pure water as the final effluent.

It could hardly have been expected, however, that the passage of solutions of salts of metals such as aluminum, iron, chromium, cobalt, nickel, manganese, etc. would produce anything different or useful.

A number of examples for carrying out the present invention will now be given.

*Example 1.—Preparation of colloidal aluminum hydroxide sol*

To prepare this it is best to start out with a solution of aluminum chloride. Thus, for example, 4.5 grams of aluminum chloride (calculated on the anhydrous $AlCl_3$ basis), are dissolved in 1000 cc. of water, preferably distilled water. In place of the aluminum chloride, a stoichiometrical equivalent amount of aluminum sulfate may be employed. This solution is then passed over a bed of an anion exchange material. The effluent from the bed of exchange material is a practically pure slightly opalescent sol of aluminum hydroxide.

By an analysis of the effluent it was found that, with a solution of the above strength, about 99.2% of conversion to the hydrous aluminum oxide has been obtained. The solution is characterized by a slightly white, turbid and somewhat opalescent appearance. It has been found that it is quite stable and samples of it have been kept for periods of over three months and even then only a very faint trace of precipitation was noticeable, which became quite readily re-dispersed upon shaking the sol.

If a stronger solution is used, for example, a 1% solution, there is a rather strong tendency for the eventual gelation of the sol to form a corresponding gel. Such gelation can, however, be prevented by the addition of small amounts of well known organic colloidal stabilizers. Also the presence of a small amount of a salt from which the sol was derived tends to have a stabilizing effect.

*Example 2.—Preparation of colloidal ferric hydroxide*

A solution containing from ½% to 1% of ferric chloride is passed through an anion exchanger, which, if it is not fresh, has been suitably regenerated by treatment with dilute alkali in the well known manner. The effluent from the bed of exchange material is a red orange and quite stable sol of ferric hydroxide.

*Example 3.—Preparation of ferrous hydroxide sol*

By starting out with a ½% to 1% solution of ferrous sulfate and passing it through a suitable bed of anion exchange material, there will be formed a white or slightly yellowish sol of ferrous hydroxide. This must be preserved out of contact with the air as it has a tendency to become oxidized to the red ferric hydroxide condition, without however producing a precipitate of ferric hydroxide.

*Example 4.—Production of sols of hydrous cobalt oxides*

A suitably dilute solution of a cobalt salt is passed through a suitable anion exchange material in the manner already indicated. The effluent will be a red sol of hydrous cobalt oxide.

*Example 5.—Production of a sol of hydrous nickel oxide*

A suitably dilute solution, say from ½% to 1% of nickel chloride, when passed through a suitable bed of anion exchange material yielded a green sol of nickel hydroxide.

*Example 6.—Ferric hydroxide sol, by hydrolysis of ferric solutions and anion exchange*

In accordance with the present example a ferric hydroxide sol can be prepared by starting out with a strong solution of a suitable ferric salt which is hydrolyzed by dilution with large quantities of water so as to form a ferric hydroxide sol, containing an acid derived from the anion of the ferric salt along with some unreacted ferric salt. This free acid is then removed from the electrolyte-containing sol along with the anion of the ferric salt left by means of an anion exchanger in a manner similar to that used in the above examples 1 through 5. Specifically, one may, for example, dissolve 20 grams of so-called 60% $FeCl_3$ (calculated on the anhydrous basis) in enough water to dissolve it and then add enough water to make a total volume of 20 cc. Inasmuch as ferric chloride is very hygroscopic, this is easily possible. This concentrated solution of ferric chloride is then poured into 1000 cc. of very hot water, say at a temperature of about 190° to 195° F. The resulting product will contain a deep cherry red aqueous colloidal sol of ferric hydroxide but also containing the HCl which had been produced as a result of the hydrolysis and some unreacted ferric chloride. The pH of this sol will be about 1.3.

This is entirely too acid to permit of its use as a colloidal sol of ferric hydroxide. Accordingly this acid sol of ferric hydroxide is passed through an anion exchanger which is either fresh or has been regenerated with alkali and washed, whereby most of the hydrochloric acid and the chloride ion from the ferric chloride will be removed. In fact, the effluent will have a pH of about 5.9.

Operating under the conditions given in this example a conversion of about 97% of ferric chloride into ferric hydroxide sol is obtained. The solution is extremely stable and will remain quite limpid for several months.

While ferric chloride has been described in connection with this example, it will be obvious that other hydrolyzable ferric salts such as ferric sulfate and ferric acetate may be substituted, with of course the formation of free sulfuric acid or free acetic acid which are then removed by anion exchange. Likewise aluminum acetate solutions can be hydrolyzed by heating and the acetic acid removed by anion exchanger.

Chromium sols can be formed by hydrolysis of chromic chloride and the chloride removed by anion exchange.

In a similar manner any colloidal solution or sol already formed but which contains an acidic impurity can be purified by the removal of said impurity by contacting such solution or sol with an alkali - regenerated anion - exchange material. Likewise, any material capable of forming a sol upon abstraction of an anion from a solution thereof may be converted into such sol by means of an alkali-regenerated anion-exchange material in the manner herein indicated.

When practicing the invention on a large scale, the salt of the metal whose hydrous oxide is to be prepared is passed through a bed of exchange material at a rate which may be as fast as one gallon of the solution per square foot of exchange material per minute. When the effluent no longer has the characteristic appearance, and when anions can be found therein by the usual testing methods, this is an indication that the exchange capabilities of the exchange material are becoming exhausted, in which case the passage of the aqueous solution of the salt is discontinued and the bed is then back-washed by means of water to remove the thereto clinging salt of the metal. Thereafter the bed is treated with a 2% to 5% solution of an alkali such as sodium hydroxide or sodium carbonate in order to regenerate the bed. During this treatment the adsorbed anions combine with the sodium hydroxide to form the corresponding salts. For instance, if it were aluminum chloride which had been converted into the aluminum hydroxide sol, then of course the chloride anion would be found on the anion exchanger, and the sodium hydroxide would remove it in the form of ordinary sodium chloride. After the effluent from the regenerating operations shows that no more of the anion is being picked up, the bed is then thoroughly washed free of thereto adhering sodium hydroxide, and then may be immediately reused for the passage thereover of further quantities either of the same salt or of some different salt of which a sol of its hydroxide is to be produced. A general theory is that the adsorption of the anions is a purely colloidal effect, and that no true compound forms between the exchanger and the anion, but irrespective of any explanation the process is not only simple but easily operated and highly useful.

While specific examples have been given of various divalent and trivalent metals, it will be self-evident that the invention is not limited thereby but may be applied to any metal or salt forming element in which the element in question is combined with an anion which is removable by anion exchangers of the type herein indicated and the resulting hydrous oxide formed is insoluble.

The apparatus necessary for the commercial operation of the present invention will of course be obvious to any skilled chemical engineer, but in general may be said to consist of suitable solution tanks and exchange beds with provisions for removing effluent, backwashing, regenerating, and washing. Therefore, it is not deemed necessary to illustrate the invention by any particular apparatus or instrumentalities. The solution can be contacted with the anion-exchange bed in any desired manner, such as for example by running them through the bed of exchange material either upflow or downflow, or in a horizontal direction; or the solution may be contacted with the exchange material in a batch type of operation.

Having thus described the invention, what I claim as new and desire to secure by Letters Patent of the United States is:

1. The process of producing a colloidal aqueous sol of aluminum hydrate which consists in passing an aqueous solution of an aluminum salt through a mass of alkali-regenerated anion-exchange material whereby the anion of said salt will be abstracted and a colloidal aqueous sol of aluminum hydrate results, the concentration of said salt in said solution not exceeding about 1% by weight of the solution.

2. The process of producing a colloidal aqueous sol of iron hydroxide which consists in passing an aqueous solution of an iron salt through a mass of alkali-regenerated anion-exchange material whereby the anion of said salt will be abstracted and a colloidal aqueous sol of iron hydroxide results, the concentration of said salt in said solution not exceeding about 1% by weight of the solution.

3. The process of producing a colloidal aqueous sol of cobalt hydroxide which consists in passing an aqueous solution of a cobalt salt through a mass of alkali-regenerated anion-exchange material whereby the anion of said salt will be abstracted and a colloidal aqueous sol of cobalt hydroxide results, the concentration of said salt in said solution not exceeding about 1% by weight of the solution.

4. Process of producing a colloidal aqueous sol of ferric hydroxide which comprises hydrolyzing a solution of a ferric salt by dilution with water, the quantity of water being sufficient to produce a dilute solution containing not substantially in excess of 1% of ferric salt, and contacting the resulting colloidal solution with a mass of an alkali-regenerated anion-exchange material to abstract anions therefrom, leaving a colloidal sol of ferric hydroxide.

5. The process of producing a colloidal aqueous sol of a hydrous oxide which consists in passing an aqueous solution of a salt of a trivalent metal, capable of forming such an oxide, through a mass of anion-regenerated anion exchange material, whereby the anion of said salt is abstracted and a colloidal sol of the hydrous oxide results, the concentration of said salt in said solution not exceeding about 1% by weight of the solution.

6. The process of producing a colloidal aqueous sol of a hydrous oxide which consists in passing an aqueous solution of a salt of an element capable of forming such an oxide through a mass of alkali-regenerated anion-exchange material, the concentration of said salt in said solution not exceeding about 1% by weight of the solution.

7. A process as claimed in claim 6 in which the concentration of salt in said solution is within the range of ½% to 1%.

8. A process of preparing a colloidal aqueous sol of ferric hydroxide which comprises preparing a solution of a ferric salt more concentrated with respect to the concentration of ferric ion than the desired solution of aqueous sol of ferric hydroxide, adding said more concentrated ferric salt solution to water heated to a temperature of at least about 190 degrees F., the quantity of water being sufficient to produce a dilute solution containing not substantially in excess of 1% of ferric salt, and contacting the resultant colloidal sol solution of ferric hydroxide with an alkali-regenerated anion-exchange material, thereby producing a stable colloidal sol of ferric hydroxide.

9. A process of preparing a colloidal aqueous sol of ferric hydroxide which comprises preparing a concentrated solution of a ferric salt, pouring this concentrated solution into a relatively large volume of hot water heated to a temperature sufficiently high to hydrolyze said ferric salt, the quantity of water being sufficient to produce a dilute solution having a concentration not substantially exceeding 1% by weight of ferric salt and contacting the resultant colloidal sol solution with an alkali regenerated anion exchange material, thereby producing an extremely stable colloidal sol of ferric hydroxide.

10. A process of preparing a colloidal aqueous sol of ferric hydroxide which comprises preparing a concentrated solution of ferric chloride by dissolving ferric chloride in water in proportions corresponding to about 20 grams of 60% ferric chloride and enough water to make a total volume of 20 cc., adding this concentrated solution to a relatively large amount of very hot water, said amount corresponding to 1000 cc. of hot water on the basis of the foregoing amount of ferric chloride, and the temperature of the water being around 190 degrees to 195 degrees F., thereby producing a red aqueous colloidal sol of ferric hydroxide containing hydrochloric acid and some unreacted ferric chloride having a pH of around 1.3, and contacting said colloidal sol solution of ferric hydroxide with an alkali regenerated anion exchange material to produce a stable colloidal sol of ferric hydroxide having a pH around 5.9.

JOHN W. RYZNAR.

REFERENCES CITED

The following references are of record in the file of this patent:

UNITED STATES PATENTS

| Number | Name | Date |
|---|---|---|
| 1,629,161 | Herrmann et al. | May 17, 1927 |
| 1,951,718 | Ziese et al. | Mar. 20, 1934 |
| 2,275,210 | Urbain | Mar. 3, 1942 |

OTHER REFERENCES

Publication: Industrial and Engineering Chemistry, June 1941, vol. 33, No. 6, page 704.

---

Certificate of Correction

Patent No. 2,438,230.  March 23, 1948.

JOHN W. RYZNAR

It is hereby certified that errors appear in the printed specification of the above numbered patent requiring correction as follows: Column 1, line 35, for "hydoxide" read *hydroxide*; column 2, line 42, for "metalllic" read *metallic*; column 6, line 28, claim 5, for "anion-regenerated" read *alkali-regenerated*; and that the said Letters Patent should be read with these corrections therein that the same may conform to the record of the case in the Patent Office.

Signed and sealed this 3rd day of August, A. D. 1948.

[SEAL]

THOMAS F. MURPHY,
*Assistant Commissioner of Patents.*